(12) United States Patent
Hoogenboom et al.

(10) Patent No.: US 11,332,554 B2
(45) Date of Patent: May 17, 2022

(54) AMIDATION OF POLYMERS CONTAINING ESTER SIDE CHAINS USING FUNCTIONALIZED AMINES

(71) Applicant: Universiteit Gent, Ghent (BE)

(72) Inventors: Richard Hoogenboom, Terneuzen (NL); Joachim Van Guyse, Ghent (BE)

(73) Assignee: Universiteit Gent, Ghent (BE)

( * ) Notice: Subject to any disclaimer, the term of this patent is extended or adjusted under 35 U.S.C. 154(b) by 26 days.

(21) Appl. No.: 17/057,904

(22) PCT Filed: May 24, 2019

(86) PCT No.: PCT/EP2019/063471
§ 371 (c)(1),
(2) Date: Nov. 23, 2020

(87) PCT Pub. No.: WO2019/224356
PCT Pub. Date: Nov. 28, 2019

(65) Prior Publication Data
US 2021/0206889 A1 Jul. 8, 2021

(30) Foreign Application Priority Data
May 24, 2018 (EP) .................................... 18174101

(51) Int. Cl.
*C08F 8/32* (2006.01)
*C08F 20/14* (2006.01)
(Continued)

(52) U.S. Cl.
CPC ............. *C08F 8/32* (2013.01); *B01J 31/0251* (2013.01); *C08F 12/22* (2013.01); *C08F 20/14* (2013.01);
(Continued)

(58) Field of Classification Search
CPC .. C08F 8/32; C08F 20/14; C08F 20/18; C08F 12/22; C08K 5/17; C08K 5/43; C08G 73/0233; B01J 31/0251
See application file for complete search history.

(56) References Cited

U.S. PATENT DOCUMENTS

| 3,897,404 A | 7/1975 | Korte et al. |
| 4,120,839 A | 10/1978 | Emmons et al. |
| 2012/0145545 A1 | 6/2012 | Bair et al. |

FOREIGN PATENT DOCUMENTS

| JP | 2016074620 A | 5/2016 |
| WO | 199957162 A1 | 11/1999 |

(Continued)

OTHER PUBLICATIONS

Easterling et al., Synthetic upcycling of polyacrylates through organocatalyzed post-polymerization modfification, Chemical Science, vol. 8, No. 11, Jan. 1, 2017, pp. 7705-7709.*

(Continued)

*Primary Examiner* — Robert D Harlan
(74) *Attorney, Agent, or Firm* — Dinsmore & Shohl, LLP (57) ABSTRACT

The invention entails the combination of basic catalysts, specifically guanidine-based catalysts, such as TBD, in conjunction with functionalized amines having a hydrogen bond donating or accepting functionality, to facilitate the accelerated transamidation of polymer compounds with non-activated ester side chains.

20 Claims, 5 Drawing Sheets

(51) Int. Cl.
    C08F 20/18    (2006.01)
    C08F 12/22    (2006.01)
    C08G 73/02    (2006.01)
    C08K 5/17     (2006.01)
    C08K 5/43     (2006.01)
    B01J 31/02    (2006.01)

(52) U.S. Cl.
    CPC .......... *C08F 20/18* (2013.01); *C08G 73/0233* (2013.01); *C08K 5/17* (2013.01); *C08K 5/43* (2013.01)

(56) References Cited

FOREIGN PATENT DOCUMENTS

| WO | 2006116363 A1 | 11/2006 |
| WO | 2013103297 A1 | 7/2013 |

OTHER PUBLICATIONS

International Search report dated Sep. 27, 2019, in reference to co-pending European Patent Application No. PCT/EP2019/063471 filed May 24, 2019.
European Search Report in reference to co-pending European Application No. EP 18174101.8 filed May 24, 2018.
Bouten, et al., "Synthesis of Poly(2-oxazoline)s with Side Chain Methyl Ester Functionalities: Detailed Understanding of Living Copolymerization Behavior of Methyl Ester Containing Monomers with 2-Akyl-2-oxazolines", Journal of Polymer Science, vol. 53, pp. 2649-2661, 2015.
Das, et al., "Activated Ester Containing Polymers: Opportunities and Challenges for the Design of Functional Macromolecules", Chemical Reviews, vol. 116, pp. 1434-1495, 2016.
Dehghani, et al., "Crosslinking Polymer Brushes with Ethylene Glycol-Containing Segments: Influence on Physiocochemical and Antifouling Properties", Langmuir, American Chemical Society, vol. 32, pp. 10317-10327, 2016.
Easterling, et al., "Synthetic upcycling of polyacrylates through organocatalyzed post-polymerization modification", Chemical Science, vol. 8, pp. 7705-7709, 2017.
Eberhardt, et al., "Synthesis of pentafluorophenyl(meth)acrylate polymers: New precursor polymers for the synthesis of multifunctional materials", European Polymer Journal, vol. 41, pp. 1569-1575, 2005.
Ferguson, et al., "Ab Initio Emulsion Polymerization by RAFT-Controlled Self-Assembly", Macromolecules, vol. 38, pp. 2191-2204, 2005.
Fleischmann, et al., "Direct Access to Functional (Meth)Acrylate Copolymers Through Transesterification with Lithium Alkozides", Journal of Polymer Science, vol. 55, pp. 1566-1574, 2017.
Henry, et al., "Surface Modiciation of Poly(methyl methacrylate) Used in the Fabrication of Microanalytical Devices", Analytical Chemistry, vol. 72, No. 21, pp. 5331-5337, Nov. 1, 2000.
Horn, et al., "Mechanisms of Organocatalytic Amidation and Trans-Esterification of Aromatic Esters as a Model for the Deploymerization of Poly(ethlene) Terephthalate", The Journal of Physical Chemistry, vol. 116, pp. 12389-12398, 2012.
Kakuchi, et al., "Activation of Stable polymeric Esters by Using Organo-Activated Acyl Transfer Reactions", Journal of Polymer Science, vol. 52, pp. 1353-1358, 2014.
Kiesewetter, et al., "Cyclic Guanidine Organic Catalysts: What Is Magic About Triazabicyclodecene?", Journal of Organic Chemistry, vol. 74, pp. 9490-9496, 2009.
Mees, et al., "Functional Poly(2-oxazoline)s by Direct Amidation of Methyl Ester Side Chains", Macromolecules, vol. 48, pp. 3531-3538, 2015.
Sabot, et al., "A convenient aminolysis of esters catalyzed by 1,5,7-triazabicyclo[4.4.0]dec-5-ene (TBD) under solvent-free conditions", Tetrahedron Letters, vol. 48, pp. 3863-3866, 2007.
Written opinion in reference to co-pending European Patent Application No. PCT/EP2019/063471 filed May 24, 2019.

* cited by examiner

- ester DBU EA
- amide DBU EA
- ester Method B PA
- amide Method B PA
- ester Method A EA
- amide Method A EA
- ester Method B EA
- amide Method B EA
- ester Method A PA
- amide Method A PA

B

- PMA ethanolamine amide
- PMA ethanolamine ester
- PCL ethanolamine amide
- PCL ethanolamine ester
- C2MestOx ethanolamine amide
- C2MestOx ethanolamine ester
- PMA allylamine amide
- PMA allylamine ester

AMIDATION OF POLYMERS CONTAINING ESTER SIDE CHAINS USING FUNCTIONALIZED AMINES

FIELD OF THE INVENTION

The invention entails the combination of basic catalysts, specifically guanidine-based catalysts, such as TBD, in conjunction with functionalized amines having a hydrogen bond donating or accepting functionality, to facilitate the accelerated transamidation of polymer compounds with non-activated ester side chains.

BACKGROUND TO THE INVENTION

Post-polymerization modifications are still one of the major challenges in macromolecular design, as opposed to reactions on small molecules, a mixture of macromolecules/polymers cannot be simply separated resulting in unreacted, partially reacted and fully reacted fractions. Therefore, post-polymerization modification reactions leading to newly defined macromolecular structures should fulfill a set of requirements as indicated in Blasco et al. (2017):
1) Chemoselectivity and inertia towards polymer structure;
2) Quantitative conversion into a broad range of functional groups; and
3) Ideally performing the reaction under mild conditions, thus avoiding side reactions.

Another challenge is to achieve high degrees of post-polymerization modification. For instance, the complete conversion of one homopolymer structure into another, rapidly encounters issues such as change in solubility, which ultimately causes dissolution/precipitation of the unreacted polymer.

Post-polymerization modification is not a new concept and has been widely reported (Henry et al, 2000; Mees & Hoogenboom, 2015). However, the direct modification of unactivated ester side chains is generally avoided, as the direct nucleophilic acyl substitution is considered a poorly controlled reaction. Therefore, others avoid the direct amidation of polymers having unactivated ester side chains by making use of activated ester side chains, such as N-hydroxysuccinimide esters or pentafluorophenyl esters. These can be introduced by (co-) polymerizing the activated ester monomer, if said activated ester is inert towards the reaction conditions or by post-polymerization modification of protected esters, which require then a deprotection step, often followed by an additional activation step (Fleischmann et al., 2017; Horn et al., 2012). Another solution that is applied is by synthesizing the direct desired monomer and then polymerizing it, but this can only be applied if the desired monomer can be polymerized under the polymerization conditions, i.e. the introduced groups are inert towards the polymerization conditions (Easterling et al., 2017).

Some reports exist on the direct modification of unactivated esters (Kakuchi et al., 2014; Sumerlin et al., 2017), however, most of them report aminolysis that was only partially performed or in poor control. Some reports exists on the quantitative aminolysis of unactivated esters (Sabot et al., 2007; Mees & Hoogenboom, 2015), however these methods are mainly limited to cheap bulk amines as it requires a huge excess of the reactant. Furthermore, it was never reported on a commercially available homopolymer.

The current invention tackles the direct, controlled (quantitative), chemoselective post-polymerization modification of polymers with unactivated esters side-chains by reacting said polymer with a basic catalyst and a reactant having at least one amine moiety and a hydrogen bond donating or accepting moiety. This invention avoids and specifically does not require the use of activated esters attained through additional post-polymerization reactions or the use of reactive ester (co)-monomers or co-monomers in general, to produce already existing functional (co)-polymers and new polymer structures.

The advantage of our solution over others is eliminating the need of having to use activated esters or requiring direct synthesis of the desired monomer. Therefore, our approach does not require the custom synthesis of polymers or post-polymerization modification into functional polymers. Our approach does not require multiple post-polymerization modification steps, thus simplifying the process and reducing the chance for incomplete and/or side reactions, which in turn makes this process more economical. Furthermore, our approach does not make use of activated ester monomers or does not involve the direct synthesis of the desired monomers. Our approach entails the use of a basic catalyst and functionalized amines containing a hydrogen bond donating or accepting group besides the amine for the transamidation of ester-containing compounds. While the use of basic catalysts such as TBD as a transesterification and transamidation catalyst is known (Easterling et al, 2017), these reactions require relatively long reaction times. However, we found that the claimed combination of a basic catalysts and functionalized amines having additional hydrogen bond donating or accepting groups provides an accelerated reaction rate to amidate polymers with non-activated ester side-chain in the monomer unit, e.g. polymethylacrylate (PMA). The advantage of this method is that the homo and co-polymers with ester side chains can be easily and readily reacted to the respective amide introducing a pendent side chain with the hydrogen bond donating or accepting moiety, facilitating the accelerated synthesis of these polymers. Therefore the method of the current invention can be applied to produce functional (co-)polymers from commodity homopolymers.

In addition, when the claimed combination of basic catalyst and functionalized amine are utilized in conjunction with a non-functional amine, the reaction rate of the latter is greatly enhanced, thus leading to the accelerated synthesis of co-polymers of their respective amides. Additionally, the acceleration effect allows the accelerated incorporation of other functional amines when mixed with this catalytic combination, which allows the synthesis of valuable functional copolymers.

SUMMARY OF THE INVENTION

In a first aspect, the present invention provides a method for the preparation of an amidated polymer, said method comprising the steps of:
  a) providing a polymer having at least one side chain, said side chain comprising one or more ester moieties;
  b) reacting said polymer of step a) with a basic catalyst and a reactant (X); said reactant having at least one amine moiety and a hydrogen bond donating or accepting moiety;
  c) obtaining said amidated polymer.

In a particular embodiment, the present invention provides a method for the preparation of an amidated polymer, said method comprising the steps of:

a) providing a homopolymer or copolymer comprising monomeric units; wherein at least 2 monomeric units having an ester-containing side chain are adjacent to each other;
b) reacting said polymer of step a) with a guanidine-based catalyst and a reactant (X); said reactant having at least one amine moiety and a hydroxy moiety;
c) obtaining said amidated polymer.

In a specific embodiment of the present invention, step b) is performed in the presence of at least one further reactant (Y) having at least one amine moiety, but lacking a hydrogen bond donating or accepting moiety.

In a specific embodiment of the present invention; said basic catalyst is selected from the list comprising Triazabicyclo-decene (TBD), Guanidine, Trimethylamine, Diazabicyclo-undecene (DBU), Methyl-triazabicyclo-decene (MTBD) and Triazabicyclo-octene. Specifically, the basic catalyst of the present invention is a guanidine-based catalyst, such as selected from the list comprising Triazabicyclo-decene (TBD), Guanidine, Methyl-triazabicyclo-decene (MTBD) and Triazabicyclo-octene; preferably Triazabicyclo-decene (TBD).

In another specific embodiment of the invention; said reactant is selected from the list comprising: imidazoles, guanidines, dialkylamines, aminoalcohols (such as but not limited to ethanolamine, propanolamine, butanolamine, pentanolamine, 1-amino-2-propanol, and aminoglycerol), alkane diamines (such as but not limited to ethylenediamine, propyl diamine, butyl diamine, pentyl diamine and hexyl-diamine), amino thiols (such as but not limited to 1,2 aminothiol, cysteine and methionine), and amino ethers (such as but not limited to 2-methoxyethylamine, 4-(2-Aminoethyl)morpholine and morpholine).

In a very specific embodiment, the reactant X has at least one amine moiety and one or more functional groups selected from: alcohols, carboxylic acids and esters. Said reactant may in particular be an aminoalcohol; such as but not limited to ethanolamine, propanolamine, butanolamine, pentanolamine, 1-amino-2-propanol, and aminoglycerol.

In yet a further embodiment, said polymer, homopolymer or copolymer; is selected from the list comprising acrylic ester (co) polymers, poly(2-oxazolines), poly(methylacrylate) (PMA), poly(methyl methacrylate) (PMMA), and poly (methyl 4-vinylbenzoate); and (co)polymers thereof.

In another particular embodiment of the present invention, step b) is performed in a solvent selected from a group comprising Dimethylsulfoxide (DMSO), Acetonitrile (ACN), Dimethylformamide (DMF), and Dimethylacetamide (DMA).

The present invention also provides the use of a guanidine-based catalyst in combination with a reactant (X) having at least one amine moiety and a hydrogen bond donating or accepting moiety; in a method for the amidation of a polymer having at least one side chain, said side chain comprising one or more ester moieties.

In a particular embodiment, the present invention provides the use of a guanidine-based catalyst in combination with a reactant (X) having at least one amine moiety and a hydroxy moiety; in a method for the amidation of a homopolymer or copolymer comprising monomeric units; wherein at least 2 monomeric units having an ester-containing side chain are adjacent to each other.

In a further embodiment, the present invention provides the use as defined herein in combination with a further reactant (Y) having at least one amine moiety but lacking a hydrogen bond donating or accepting moiety.

BRIEF DESCRIPTION OF THE DRAWINGS

With specific reference now to the figures, it is stressed that the particulars shown are by way of example and for purposes of illustrative discussion of the different embodiments of the present invention only. They are presented in the cause of providing what is believed to be the most useful and readily description of the principles and conceptual aspects of the invention. In this regard no attempt is made to show structural details of the invention in more detail than is necessary for a fundamental understanding of the invention. The description taken with the drawings making apparent to those skilled in the art how the several forms of the invention may be embodied in practice.

DETAILED DESCRIPTION OF THE INVENTION

As already discussed herein above, in a first aspect, the present invention provides a method for the preparation of an amidated polymer, said method comprising the steps of:
a) providing a polymer having at least one side chain, said side chain comprising one or more ester moieties;
b) reacting said polymer of step a) with a basic catalyst and a reactant (X); said reactant having at least one amine moiety and a hydrogen bond donating or accepting moiety;
c) obtaining said amidated polymer.

In a specific embodiment, the present invention provides a method for the preparation of an amidated polymer, said method comprising the steps of:
a) providing a homopolymer or copolymer comprising monomeric units; wherein at least 2 monomeric units having an ester-containing side chain are adjacent to each other;
b) reacting said polymer of step a) with a guanidine-based catalyst and a reactant (X); said reactant having at least one amine moiety and a hydroxy moiety;
c) obtaining said amidated polymer.

The invention in particular makes use of homopolymers and (co)polymers with pendant ester side chains. As further detailed in the examples part, it was specifically found that polymers in which 2 or more ester-containing side-chains are adjacent to each other, an accelerated amidation occurs.

Hence, the present invention is specifically directed to homopolymers and copolymers wherein at least 2 monomeric units having an ester-containing side chain, are directly coupled to each other. As a consequence, the present invention is not directed to the use of alternating copolymers, in as far as these do not have 2 adjacent ester-containing side chains. Therefore, the present invention also provides a method as defined herein wherein said copolymer is not an alternating copolymer.

In the context of the invention, a side chain is meant to be a chemical group attached to the backbone of the (co)polymer, said chemical group thus containing one or more ester moieties. While ester moieties may also be present in the backbone of the (co)polymer, such as introduced during the polymerization reaction (e.g. polyesters), these backbone-esters are not referred to as being the one or more ester moieties of the side chain, within the context of the invention.

An ester moiety in the context of the invention is meant to be a chemical group derived from an acid moiety in which at least one —OH is replaced by an alkoxy group. Such esters may be generally represented as follows:

Hence, a (co)polymer of the invention including an ester-containing side chain, may be generally represented as follows:

wherein ⸳⸳⸳ represents the (co)polymer backbone, and R represents any carbon-containing moiety.

In a specific embodiment, said (co)polymer of the present invention may be selected from the list comprising: acrylic ester (co) polymers, poly(2-oxazolines), poly(methylacrylate) (PMA), poly(methyl methacrylate) (PMMA), and poly(methyl 4-vinylbenzoate); and (co)polymers thereof.

In the context of the present invention, an amidated (co)polymer is meant to be a (co)polymer containing at least one amide moiety. Such amide moiety is generally represented as follows for a secondary amide moiety that is formed: Note that when using a secondary amine for the amidation reaction, the final polymer will contain a tertiary amide group where H is R″ in the structures below.

Hence an amidated co(polymer) according to the present invention may be generally represented as follows:

wherein ⸳⸳⸳ represents the (co)polymer backbone, and R' represents any carbon-containing moiety.

In the method of the present invention, the one or more ester-containing moieties in the side chain of the (co)polymers are converted into amide-containing moieties and the method may thus generally be represented as follows:

The method of the present invention is performed in the presence of a basic catalyst. A catalyst in the context of the present invention is meant to be a substance which is added to the reaction for increasing the rate of the chemical reaction due to its participation in such reaction. The present invention specifically uses basic catalysts, since acidic conditions would result in the hydrolysis of the amide. Basic catalysts deprotonate the intermediates and thereby lower the activation energy.

In a specific embodiment of the present invention, the basic catalyst may be selected from the list comprising Triazabicyclo-decene (TBD), Guanidine, Trimethylamine, Diazabicyclo-undecene (DBU), Methyl-triazabicyclo-decene (MTBD), Triazabicyclo-octene and combinations thereof. Specifically, the basic catalyst of the present invention is a guanidine-based catalyst, such as selected from the list comprising Triazabicyclo-decene (TBD), Guanidine, Methyl-triazabicyclo-decene (MTBD) and Triazabicyclo-octene; preferably Triazabicyclo-decene (TBD).

The method of the present invention is furthermore performed in the presence of a reactant (X) having at least one amine moiety and a hydrogen bond donating or accepting moiety; preferably a hydroxy moiety. The amine used for the amidation reaction can be a primary or a secondary amine. In order for a hydrogen bond to occur, there must be both a hydrogen donor and an acceptor present in the reaction. The donor in a hydrogen bond is the atom to which the hydrogen atom participating in the hydrogen bond is covalently bonded, and is usually a strongly electronegative atom such as N, O or F. The hydrogen acceptor is the neighboring electronegative ion or molecule and must possess a lone electron pair (such as in an amine) in order to form a hydrogen bond.

In the context of the present invention, the reactant (X) having at least one amine moiety and a hydrogen bond donating or accepting moiety, specifically hydroxy moiety, may also be referred to as a functional amine. Such amine moiety is generally known to contain a basic nitrogen atom and at least one lone electron pair). In the current context, the amine has at least one hydrogen atom attached for the amidation reaction to occur (primary or secondary amine). Moreover, the amine further possesses one or more functional groups capable of acting as a hydrogen bond donor or acceptor (ketone, aldehyde, alcohol, carboxylic acid, ester, amine, imine, amide imide, halo, nitrile, imidazole). In a particular embodiment of the present invention, the reactant X has at least one amine moiety and one or more functional groups selected from: alcohols, carboxylic acids and esters.

In a particular embodiment, the reactant (X) as used in the methods of the present invention may be represented as follows wherein n represents an integer and X represent a hydrogen bond donating or accepting moiety. In such embodiment, X may for example be selected from the list comprising —OH, =O, —O—R', —NR'R", —S—R', carboxyl, and nitrile. While said functional amine may be linear as represented herein before, it may also be branched (e.g. secondary amine), be an amine-containing heterocycle, such as being an imidazole moiety, a pyridine moiety, . . . . The reactant (X) may further be an imine, urea or carbamate compound.

In a very specific embodiment, the reactant may be selected from the list comprising imidazoles, guanidines, dialkylamines, aminoalcohols, alkane diamines, amino thiols, and amino ethers; in particular aminoalcohols.

In a specific embodiment of the present invention, step b) is performed in the presence of at least one further reactant (Y) having at least one amine moiety, but lacking a hydrogen bond donating or accepting moiety.

Hence, by making use of 2 or more amine-containing reactants, wherein at least one of the reactants is functionalized by the presence of a hydrogen bond donating or accepting moiety, specifically hydroxy moiety, accelerated co-amidation is achieved. In particular, in such instance, the reaction rate of the non-functionalized amine-containing reactant (Y) is greatly enhanced, due to the presence of the functionalized amine-containing reactant (X); thereby leading to the accelerated synthesis of co-polymers of their respective amides. Additionally, the acceleration effect allows the accelerated incorporation of other functional amines when mixed with this functionalized amine-containing reactant (X), which allows the synthesis of valuable functional copolymers.

Therefore, the present invention further provides a method for the preparation of an amidated polymer, said method comprising the steps of:
a) providing a polymer having at least one side chain, said side chain comprising one or more ester moieties;
b) reacting said polymer of step a) with basic catalyst, at least one reactant (X) and at least one reactant (Y); wherein
said reactant (X) has at least one amine moiety and a hydrogen bond donating or accepting moiety (i.e. functionalized reactant); and
said reactant (Y) has at least one amine moiety but lacks a hydrogen bond donating or accepting moiety (i.e. non-functionalized reactant); and
c) obtaining said amidated polymer.

In a particular embodiment, the present invention further provides a method for the preparation of an amidated polymer, said method comprising the steps of:
a) providing a homopolymer or copolymer comprising monomeric units; wherein at least 2 monomeric units having an ester-containing side chain are adjacent to each other;
b) reacting said polymer of step a) with guanidine-based catalyst, at least one reactant (X) and at least one reactant (Y); wherein
said reactant (X) has at least one amine moiety and a hydroxy moiety (i.e. functionalized reactant); and
said reactant (Y) has at least one amine moiety but lacks a hydrogen bond donating or accepting moiety (i.e. non-functionalized reactant); and
c) obtaining said amidated polymer.

In the context of the present invention, an aminoalcohol is meant to be a compound containing an amine group and an alcohol group (—OH), functioning as the hydrogen bond donor or acceptor group. In a specific embodiment, said aminoalcohol may be selected from the list comprising: propanolamine, butanolamine, pentanolamine, 1-amino-2-propanol, aminoglycerol and amino-containing sugars, such as aminoglucose.

In the context of the present invention, an alkane diamine is meant to be a compound containing two amine group, one functioning as the hydrogen bond donor or acceptor group; both being separated by an alkyl chain. In a specific embodiment, said alkane diamine may be selected from a list comprising ethylenediamine, propyl diamine, butyl diamine, pentyl diamine and hexyldiamine.

In the context of the present invention, an amino thiol is meant to be a compound containing an amine group and a thiol group (—S—R') functioning as the hydrogen bond donor or acceptor group. In a specific embodiment, said amino thiol may be selected from the list comprising: 1,2 aminothiol, cysteine and methionine.

In the context of the present invention, an amino ether is meant to be a compound containing an amine group and an ether group (O—R') functioning as the hydrogen bond donor or acceptor group. In a specific embodiment, said amino ether may be selected from the list comprising: 2-methoxyethylamine, 4-(2-Aminoethyl)morpholine and morpholine.

While the method of the present invention may be performed in a solvent-free environment, alternatively, in step b) a solvent may be used. In such event, said solvent may be selected from the list comprising: Dimethylsulfoxide (DMSO), Acetonitrile (ACN), Dimethylformamide (DMF), and Dimethylacetamide (DMA).

In a final aspect, the present invention provides the use a guanidine-based catalyst in combination with a reactant having at least one amine moiety and a hydrogen bond donating or accepting moiety; in a method for the amidation of a polymer having at least one side chain, said side chain comprising one or more ester moieties.

In a very specific embodiment, the present invention provides the use of a guanidine-based catalyst in combination with a reactant (X) having at least one amine moiety and a hydroxy moiety; in a method for the amidation of a homopolymer or copolymer comprising monomeric units; wherein at least 2 monomeric units having an ester-containing side chain are adjacent to each other.

The combination of the above-mentioned polymers (including homopolymers and copolymers), catalysts and reactants results in an accelerated amidation reaction of the polymer, with quantitative conversion. Furthermore, the addition of an additional amine, which in its own does not cause the same accelerative effect, to the above-mentioned combination results in an expedited amidation of this other amine as well (i.e. co-amidation effect).

Process Details

The reaction can be performed in absence of solvent or utilizing several suitable solvents such as DMSO, DMF, DMA and ACN. The reaction is generally performed with 0.5 molar equivalents of catalyst versus the ester, but could be lowered or increased to influence the reaction rate, ranging from 0.05-3 equivalents. The operating temperature at which the examples are provided is 70° C., but can vary in the range of 0-200° C. The number of molar equivalents of amine to ester can vary on the desired substitution degree, from 0.2-6 equivalents. Reaction time will vary on the above mentioned conditions and the desired degree of substitution of the resulting product.

EXAMPLES

Example 1: Accelerated Amidation of Non-Activated Ester Side Chain Bearing Polymers with Functional Amines Introduction Post-polymerization modification reactions (PPMRs) are an indispensable tool in the design of functional polymer structures, playing a key role in the design of next generation materials, such as polymer-drug conjugates and stimuli responsive materials. Having evolved in parallel with functional monomer synthesis strategies, PPMRs generally begin where functional monomer synthesis ends; i.e. post-polymerization. While the polymerization mechanism (radical, anionic, cationic, . . . ) imposes certain limitations on the synthesis of functional monomers, PPMRs are generally free of limitations. However, in order to be of practical use and complement the functional monomer synthesis, PPMRs are required to be chemoselective and inert towards the polymer backbone, viz avoid chain degradation, be quantitative in nature and proceed under relatively mild conditions to avoid potential side reactions (Dehghani et al., 2016). These principles also resemble the key principles embodied by the concept 'click chemistry', hence many 'click-type reactions' are commonly applied in post-polymerization modification. Some examples are the Cu(I)-catalyzed azide-alkyne cycloaddition (CuAAC), thiol-ene, thiolyne-acetal click and pentafluorophenyl(PFP)-click reactions. The latter is mainly applied in the design of functional ester/amide bearing polymers, utilizing an activated PFP-ester monomer as a reactive handle. The use of such activated esters is widely applied in (meth)acrylate chemistry (Das et al., 2016; Eberhardt et al., 2005). While common in (meth)acrylate chemistry, the direct conversion of unactivated (meth)acrylate polymers is less well established, despite the prevalence of (meth)acrylate polymers in many applications. Only a handful of reports exist on the direct modification of poly(meth)acrylates or other unactivated ester side-chain bearing polymers, partially due to the well-established activated ester alternatives and the challenging nature of direct PPMR of unactivated esters (Easterling et al., 2017; Kakuchi et al., 2014; Mees et al., 2015; Fleischmann et al., 2017). Here, the transesterification and amidation is generally performed under harsh conditions. For the transesterification, Fleischmann et al., 2017 utilized lithium alkoxides to accomplish the successful conversion of PMMA. In amidation, Mees & Hoogenboom et al., 2015 showed the direct conversion of methylester bearing poly(2-oxazoline)s, whilst refluxing the polymer solution in an excess of amine. On poly(meth)acrylates Kakuchi et al. 2014 and Easterling et al., 2017 showed the use basic catalysts to expedite the transesterification/amidation of less-activated and non-activated poly(meth)acrylates. Their successful approaches present a useful alternative to the activated ester approach in the design of functional polymer structures. The reported reactions, however, require prolonged heating at high temperatures, a common limitation of these systems. In addition, the introduced moieties were relatively simple in nature, as most substrates were limited to aliphatic amines. Within this work we report the accelerated amidation of certain amino-substrates, i.e. amines having another nucleophilic moiety. Here we show that the addition of another functional group greatly enhances the reaction rate on esters with one and two substituents on the R-position, namely poly(C2MestOx) and poly(methylacrylate). The presence of additional nucleophilic moieties, such as alcohol, thiol, amine and imidazole greatly accelerate the reaction, leading to increased utility of this reaction and opening new design and synthesis opportunities.

Experimental Details

Materials

The following chemicals were used as received, unless otherwise stated. Barium oxide (BaO, 90%), magnesium sulfate (MgSO4, anhydrous, 97%), 2-chloroethylamine hydrochloride (98%), and potassium hydroxide (KOH, 99.98%) were purchased from Acros Organics. Sodium methoxide (NaOMe, 95%), thionyl chloride (SOCl2, ≥99%), sodium carbonate (Na2CO3, anhydrous, >99%), piperidine (99%), methyl p-toluenesulfonate (MeOTs, 98%), ethylenediamine (EDA, 99%), Allylamine (99%), propylamine (PA, 99%), aminopropylimidazole (API, 99%) methylacrylate (99%), tetrahydrofuran (THF, >99%), acetonitrile (ACN, 99%) dimethylsulfoxide (DMSO, >99%), N,N-dimethylformamide (DMF, ≥99%), diethylether (Et2O, >99%), triethylamine (TEA, 99%) 1,8-Diazabicyclo(5.4.0)undec-7-ene (DBU, 98%) and triazabicyclodecene (TBD, 98%), 2,2'-Azobis(2-methylpropionitrile) (AIBN) were purchased from Sigma-Aldrich. Succinic anhydride (95%), ethanolamine (EA, 99%), propanolamine (99%), propan-2-olamine (99%), butanolamine (99%), pentanolamine (99%) and 1,2,4 triazole (98%) were purchased from TCI. AlO3 was purchased from Fischer scientific. Piperidine, MeOTs, and DBU were further purified by distillation. Inhibitor removal of methylacrylate was done by flowing the monomer over an AlO3 plug. 2-Ethyl-2-oxazoline (EtOx) was kindly provided by polymer chemistry innovations, and was further purified by distilling over BaO and ninhydrin. Deuterated water (D2O), dimethylsulfoxide (DMSO-d6), and chloroform (CDCl3) were purchased from Eurisotop. C2MestOx was synthesized following a previously reported protocol (Bouten et al., 2015). 2-(((Butylsulfanyl)carbonothioyl)sulfanyl)propanoic acid (PABTC) was synthesized according to a previously described protocol. (Ferguson, C. J. et al., 2005).

Equipment

A Bruker Avance 300 MHz Ultrashield and Bruker Avance II 400 MHz were used to measure 1H-nuclear magnetic resonance (1H NMR) spectra at room temperature, the chemical shifts are given in parts per million (δ) relative to tetramethylsilane. Heteronuclear Multiple Bond Correlation, are measured on a Bruker Avance II 500 MHz at room temperature. Size-exclusion chromatography (SEC) was performed on a Agilent 1260-series HPLC system equipped with a 1260 online degasser, a 1260 ISO-pump, a 1260 automatic liquid sampler (ALS), a thermostatted column compartment (TCC) set at 50° C. equipped with two PLgel 5 μm mixed-D columns (7.5 mm×300 mm) and a precolumn in series, a 1260 diode array detector (DAD) and a 1260 refractive index detector (RID). The used eluent was N,N-dimethyl acetamide (DMA) containing 50 mM of LiCl at a flow rate of 0.500 mL/min. The spectra were analysed using the Agilent Chemstation software with the GPC add on. Molar mass values and molar mass distribution, i.e. dispersity (Đ) values were calculated against Poly(methyl methacrylate) standards from PSS. Electron spray ionisation mass spectrometry spectra were acquired on a quadrupole ion trap liquid chromatography mass spectrometer (LCMS) (Thermo Finnigan MAT LCQ mass spectrometer) equipped with electrospray ionization. Gas chromatography (GC) was performed on an Agilent 7890A system equipped with a VWR Carrier-160 hydrogen generator and an Agilent HP-5 column of 30 m length and 0.320 mm diameter. A flame ionization detector was used and the inlet was set to 250° C. with a split injection of ratio 25:1. Hydrogen was used as carrier gas at a flow rate of 2 mL/min. The oven temperature was increased with 20° C./min from 50° C. to 120° C., followed by a ramp of 50° C./min to 300° C. Infrared (IR) spectra were measured on a Perkin-Elmer 1600 series FTIR spectrometer and are reported in wavenumber (cm-1). Lyophilisation was performed on a Martin Christ freeze-dryer, model Alpha 2-4 LSC plus. Preparative SEC was performed on disposable PD-10 desalting columns from GE Healthcare. The polymerizations were performed in capped vials in a single mode microwave Biotage initiator sixty (IR temperature sensor). Annotated NMR spectra and additional characterization data can be found in the supporting information. Infrared spectra were obtained with ReactIR 4000 instrument (Mettler Toledo AutoChem ReactIR™) using a silicone probe (SiComp, optical range) 4400-650 cm-1. For on-line monitoring, the silicon probe was introduced into a two-necked glass flask, equipped with a stir bar.

Synthesis of Poly(C2MestOx)

C2MestOx (7.073 mL, 45 mmol), MeOTs (0.340 mL, 2.25 mmol) and acetonitrile (ACN) (7.827 mL), were added to a 20 mL microwave vial and then polymerized in the Biotage microwave for 3 min at 140° C. Termination of the polymer was done with piperidine. Precipitation was done in a tenfold excess of Et2O for both polymers and the resulting precipitate was isolated, dissolved in water and freeze dried. Mn=5.4 kDa Đ=1.06

Synthesis of Poly(methylacrylate) (PMA)

PMA was synthesized via RAFT polymerization. Generally, a 3 M solution was prepared of methylacrylate (21.6 mL, 0.24 mol, 1 equivalent) with PABTC (0.680 g, 0.0024 mol, 0.01 equivalents) and AIBN (118 mg, 0.00072 mol, 0.003 equivalents) were dissolved in 58 mL of DMF. Next, the solution was placed in an ice bath and degassed by bubbling argon through the solution. Approximately 30 minutes later, the solution was transferred to an oil bath of 70° C. and heated for 50 minutes. Afterwards the polymerization mixture was cooled and exposed to air and the polymer was finally isolated by precipitation in ether. The polymer was obtained as a yellow viscous liquid.

SEC: Mn=6.6 kDa, Đ=1.24.

Kinetic Investigations with React IR

The reaction kinetics were followed via ReactIR, as the resolved ester peak (1770-1700 cm-1) allows for straightforward quantification of the amount of esters in the reaction, thus obtaining reliable kinetic information. The amide/product peak (1698-1645 cm-1) could also be identified as a shoulder appearing on the C=O stretching signal of the PMA ester, and the tertiary amide and ester of poly (C2MestOx) respectively. The increase of the secondary amide signal is in good agreement with the decreases observed in the ester signal. All obtained spectra were normalized on the C—O stretching signal at 1300 cm-1 and the baseline correction was taken at 1830 cm-1. The ester and amide signals were integrated and the surface area under the peaks were calculated versus the baseline of the integration range. The measurement interval was varied depending on the reaction rate, ranging from measurements every 15 seconds to every minute.

General Amidation Procedure Utilising DBU and 1,2,4-Triazole (Procedure A)

Here the amidation procedure was adjusted from the reported procedure by Kakuchi et al., 2014. A solution of polymer (2.5 mmol of ester groups, 1 eq) in 2 mL DMSO was prepared. Next a solution of DBU (1.25 mmol, 0.5 eq), 1,2,4-triazole (172 mg, 2.5 mol, 1 eq) and amine (15 mmol, 6 eq) and the appropriate volume of DMSO (to obtain a 3 mL solution) was prepared. Next, the solution containing the catalyst and amine was added to the ReactIR vial and the solution was heated in an oil bath at 70° C. After an equilibration time of 5 min, the measurements were paused, and the solution of polymer was added. Immediately after, the measurements were resumed and the reaction was followed in time.

General Amidation Procedure of TBD (Procedure B)

A solution of polymer (2.5 mmol of ester groups, 1 eq) in 2 mL DMSO was prepared. Next a solution of TBD (1.25 mmol, 0.5 eq) and amine (15 mmol, 6 eq) and the appropriate volume of DMSO (to obtain a 3 mL solution) was prepared. Next, the solution containing the catalyst and amine was added to the ReactIR vial and the solution was heated in an oil bath at 70° C. After an equilibration time of 5 min, the measurements were paused, and the solution of polymer was added. Immediately after, the measurements were resumed and the reaction was followed in time. After the measurements, the polymers were isolated by precipitation of the polymer solution in THF. The polymer was isolated by centrifugation of the dispersion, removal of supernatant and subsequent dissolution in water. Finally, the polymer was purified by preparative SEC, and the obtained fractions were freeze dried.

Results and Discussion

First, we compared the amidation reaction with different catalytic systems on pendant esters, which were monosubstituted on the R-position (C2MestOx), were the reaction kinetics of ethanolamine and propylamine were compared. Here we compared the catalytic system reported by Kakuchi et al., 2014, viz. 1,2,4-triazole paired with DBU to the catalytic system utilising TBD on poly(C2MestOx).

Figure 1:
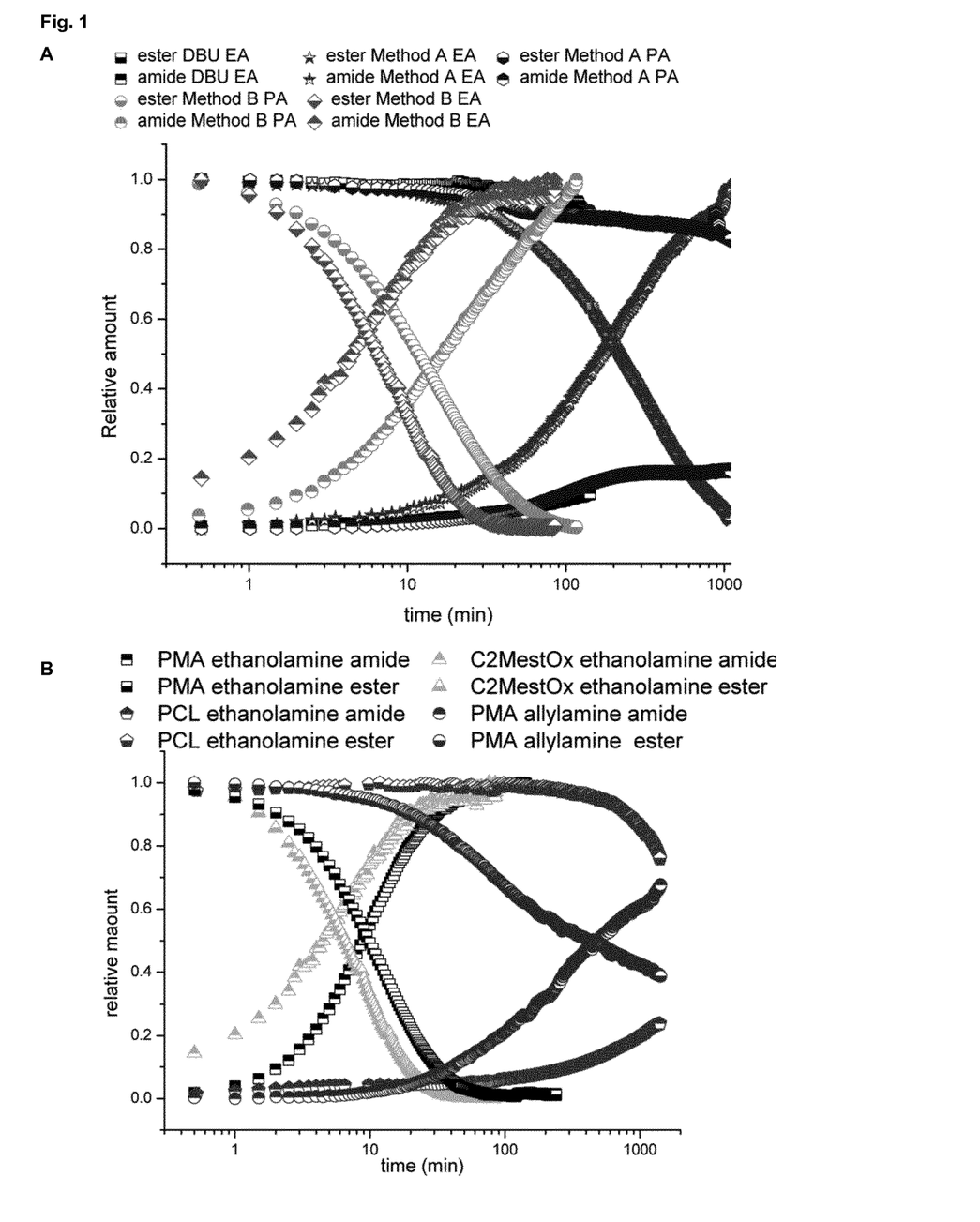
FIG. 1: A: kinetic investigation comparing the reaction rates of method A with method B for EA and PA, plotting the relative amount of ester and amide in function of time. B. Kinetic investigation comparing the reaction rates of EA on Poly($C_2$MestOx), PMA and PCL, plotting the relative amount of ester and amide in function of time.

Poly(C2MestOx) was chosen as it is the most reactive and least sterically hindered ester substrate, therefore allowing the best comparison of both catalytic systems in terms of reaction rate. FIG. 1A shows the conversion of ester to amide in function of time, thus comparing the reaction rate of procedure A without added triazole, procedure A with triazole and procedure B, with ethanolamine and propylamine (reactant with amine moiety, but without further hydrogen donating or accepting moiety). From FIG. 1 it can be clearly seen that the reaction rate in presence of ethanolamine is greatly enhanced compared to propylamine. Also the addition of 1,2,4-triazole greatly accelerates the reaction rate. Hence, the presence of a hydrogen donating or accepting moiety in the amine-containing reactant hugely increases the reaction rate.

When the catalytic system is switched, i.e. utilising TBD as catalyst the reaction rate increases dramatically, for both propylamine and ethanolamine. However, in both procedure A and B, ethanolamine shows an enhanced reactivity compared to propylamine, suggesting the presence of an additional catalytic effect for reactants having a hydrogen donating or accepting moiety. An additional catalytic effect of amidation reaction with ethanolamine has been described earlier in literature in the degradation of poly(ester)s (Horn et al., 2012), however when we performed procedure B on polycaprolactone (PCL) (polymer lacking ester side-chains), the reaction rate dropped dramatically (see FIG. 1B). This observation therefore suggests another catalytic effect present, which is present on pendant ester substrates, but not on poly(ester)s, i.e. esters in the polymer backbone, despite both PCL and poly(C2MestOx) esters being mono-substituted in the R-position. This hypothesis is further supported by the report of Easterling et al., 2017, where the nature of the expelled alcohol has little influence on the reaction rate of the amidation, as the amidation of poly(n-butylacrylate) quantitatively yielded the corresponding amide (Easterling et al., 2017). This therefore attributes an additional catalytic effect in presence of aminoalcohols on pendant ester substrates. We hypothesized that this effect may be attributed to the efficient hydrogen bonding of the formed amide with the pendant alcohol, where the alcohol may play a role in lowering the activation energy by coordinating to the carbonyl groups of neighbouring esters. In addition, when TBD is utilized as a catalyst, the formed secondary amide and pendant alcohol groups can coordinate with the catalyst, resulting in the increased reactivity observed with this catalyst.

Figure 2:
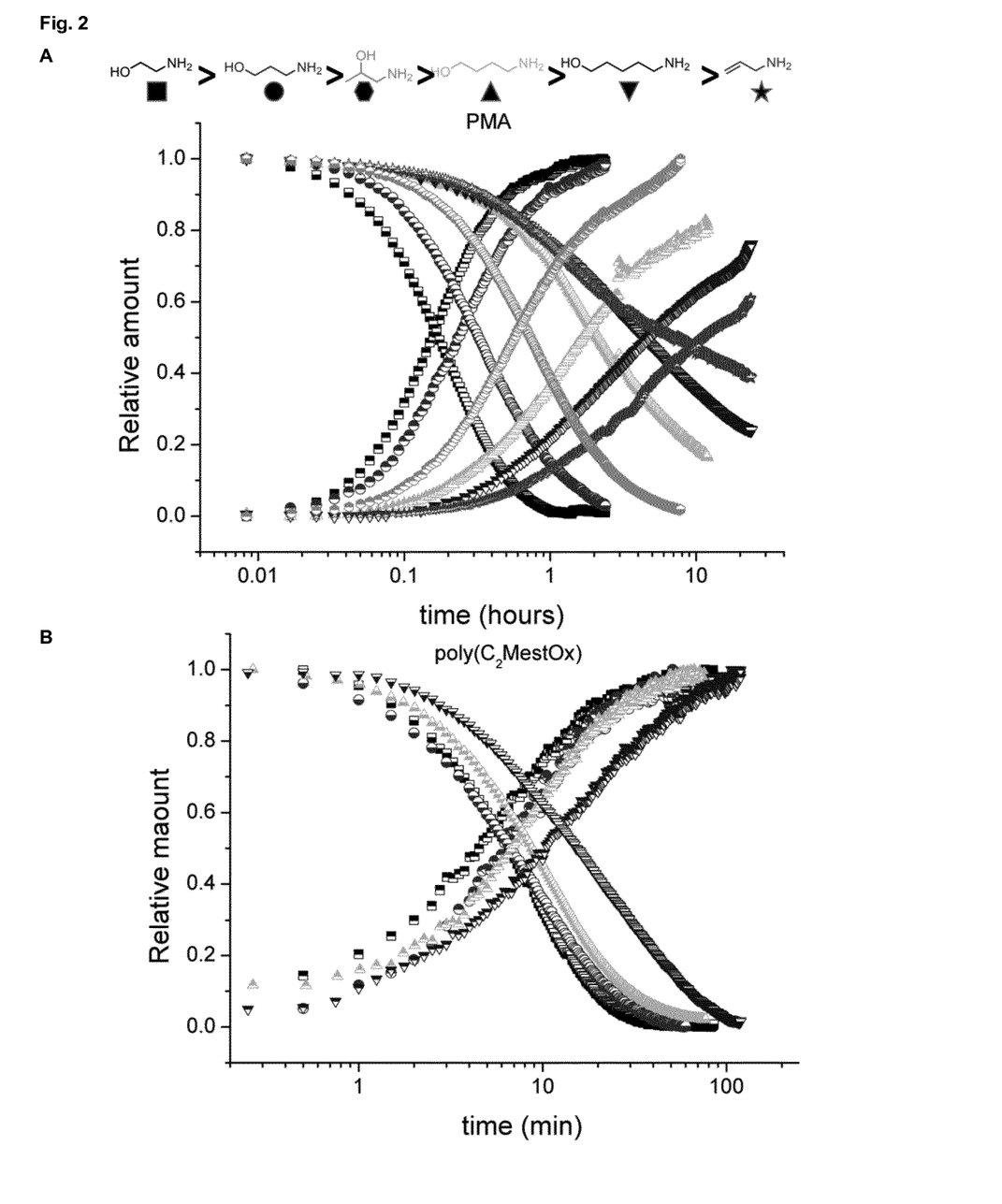
FIG. 2: Kinetic investigation comparing the reaction rates of aminoalcohols with an increasing carbon spacer length on poly($C_2$MestOx) (A) and PMA (B), plotting the relative amount of ester and amide in function of time.

In order to confirm this theory, we assessed the reactivity of different aminoalcohols (reactants), with an increasing spacer length between the respective amine and alcohol on both poly(C2MestOx) and PMA. When increasing the spacer length, the reactivity rate gradually drops, due to less efficient coordination to the catalyst and neighbouring ester carbonyl groups imposed by the increased steric bulk of an increasing carbon spacer (FIG. 2). FIG. 2 shows the gradual reactivity drop in the series ethanolamine>propanolamine>propan-2-ol-amine>butanolamine>pentanolamine>propylamine. Here it can be observed that the reactivity of C2MestOx is greater than PMA, since PMA is disubstituted on the ß-carbon, resulting in greater steric hindrance, which impairs the subsequent formation of the bulky acetyl-TBD adduct. This observation coincides with previous reports (Easterling et al., 2017; Kiesewetter et al., 2009). Since hydrogen bonding with the TBD catalyst seems to effectively enhance the reaction rate, we investigated different substrates which could also lead to an increased reaction rate compared to aliphatic primary amines. Here we investigated the effect of ethylenediamine, amino-propylimidazole and aminoglycerol. These substrates possess an additional nucleophilic moiety, which can act either as a hydrogen bond acceptor or hydrogen bond donor, similar to the aminoalcohols presented above. Their hydrogen bonding capability with TBD is depicted in FIG. 3, together with their kinetic data of the amidation reaction on PMA.

Figure 3:
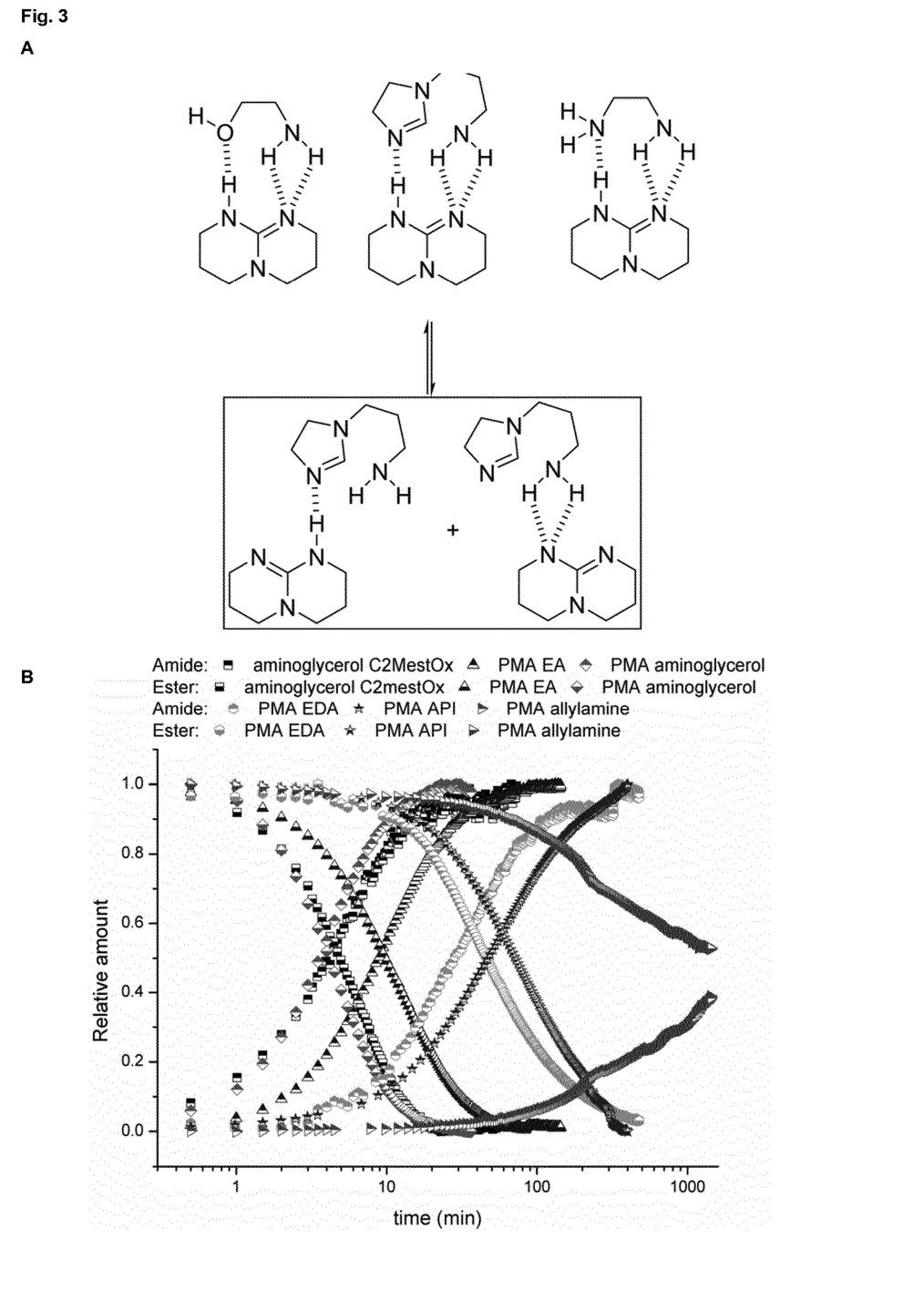
FIG. 3: Proposed functional amines capable of forming efficient hydrogen bonding partners with TBD (A) and their kinetic investigation on PMA (B) displayed by relative amount of ester and amide in function of time.

FIG. 3 shows that the presence of an additional alcohol, viz. aminoglycerol, greatly expedites the reaction compared to ethanolamine. The other investigated amines, ethylenediamine and amino-propylimidazole, also show an acceleration of the reaction rate compared to aliphatic amines (allylamine) but the reaction rate increase is not as pronounced as in the alcoholamines. However, the increase in reaction rate of these functional amines does support the hypothesis of increased hydrogen bonding being an additional driving force for the amidation reaction, for both hydrogen bond donors, such as amines and alcohols, and hydrogen bond acceptors, such as imidazoles.

As a final experiment, we investigated the utilisation of aminoalcohols to expedite the amidation reaction of aliphatic amines. Therefore, the excess of amine was kept constant at 6 equivalents to ester, only varying the amount of amine from an equimolar mixture of ethanolamine to propylamine (3:3) to a 1:5 mixture of ethanolamine and propylamine. Through this experiment, we could compare the reaction rates of the separate amines from the final obtained ratio of their respective amides via $^1$H NMR. With this information, the discrimination between a self-catalysed process, i.e. ethanolamine only catalyses self-incorporation, or a co-catalytic action, incorporation of ethanolamine promotes the reaction of propylamine and itself, could be achieved.

Figure 4:
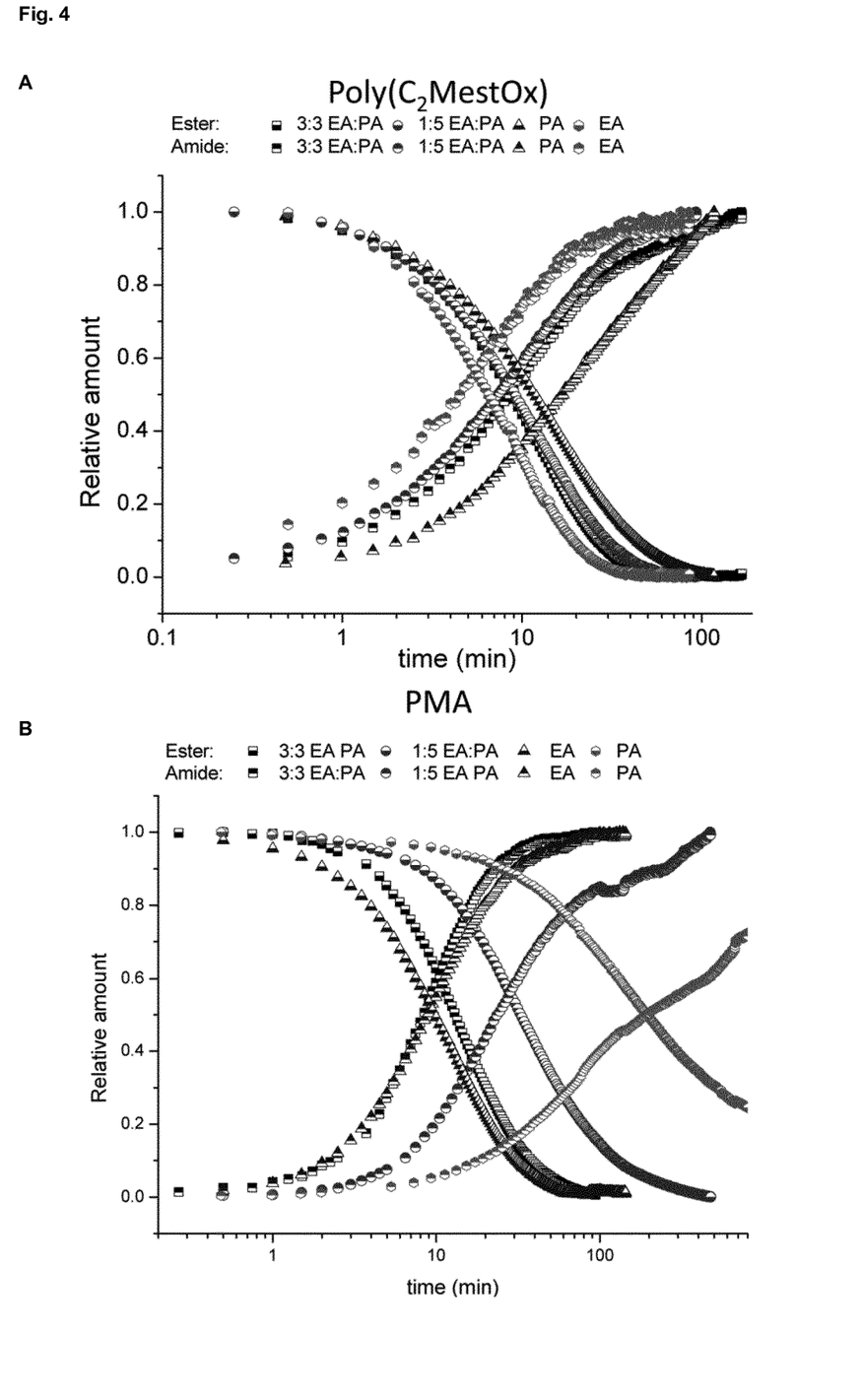
FIG. 4: Amidation kinetics of EA, PA, EA:PA in a 3:3 ratio and EA:PA in a 1:5 ratio on Poly($C_2$MestOx) (A) and PMA (B), expressed as relative amount of ester and amide in function of time.

As can be seen from FIG. 4, the reaction rate is significantly accelerated in the presence of ethanolamine, for both ratios. The difference in reactivity however is less pronounced on Poly(C$_2$MestOx), but is clearly distinguishable in the case of PMA. Here an equimolar mixture of both amines show a similar conversion rate as when the reaction is done solely with EA. However, when the ratio of PA increases, the conversion rate drops, but the reaction still proceeds at an accelerated pace, which is between that of propanolamine and propan-2-olamine. From the NMR data, we can also conclude that the incorporation of propylamine proceeds at an increased pace, as when the amidation was performed with Poly(C$_2$MestOx) the resulting polymer contained 35% and 68% propylamide for the 3:3 and 1:5 EA:PA ratio, respectively.

Conclusion

Within this set of examples, we examined the acceleration effect of certain functional amine substrates on the amidation of polymers bearing pendant ester groups. Here we found that in both the DBU and 1,2,4-triazole catalysed amidation (procedure A) and TBD catalysed amidation proceed in an accelerated fashion when using functional amines, such as alcohololamines. Here it became apparent that the TBD catalysed amidation is the most promising catalyst, due to the high turn-over rates in a relevant timescale for pendant polymeric esters mono- or -disubstituted on the ß-carbon.

Furthermore, the presence of pendant ester side chains is a crucial contributing factor in the observed high turn-over rates, proven by the ±100 fold reduction in reaction rate for monosubstituted esters on the ß-carbon. This effect is potentially caused by the hydrogen bonding that can be established between neighbouring pendant esters and amides, a feature which is strongly inhibited in poly(ester)s, such as PCL. Further exploitation of the intramolecular hydrogen bonding, by incorporating H-bond accepting or donating moieties, such as alcohol, amine and imidazole groups, further increases the reaction rate. This strategy proved to have a good synergy with the TBD catalyzed amidation, due to additional hydrogen bonding with the catalyst, as evidenced by the increased reaction rates when using these reactants.

Lastly, the utilization of these functional amines could be exploited in the acceleration of the amidation reaction with aliphatic amines, where mixtures of ethanolamine and propylamine showed an increased overall reaction rate and successful conversion into their respective amides. Therefore suggesting that the incorporation of extra pendant hydrogen bonding moieties on the polymer chain catalyses a more efficient incorporation of both functional and non-functional amines.

In summary, the proposed accelerated amidation of pendant esters presents a valuable tool in the design and synthesis of functional polymer structures from pendant ester polymers. This approach allows the efficient conversion of pendant ester moieties and can be exploited on several (co)polymer structures in abundant use today, such as acrylate esters and acrylate thioesters. By utilising aminoalcohols, diamines, aminothiols, or functional amines bearing hydrogen bond accepting or donating groups, such as aminopropylimidazole, a wide variety of (co)polymers can be easily obtained.

Example 2: Accelerated Co-Amidation

Figure 5:
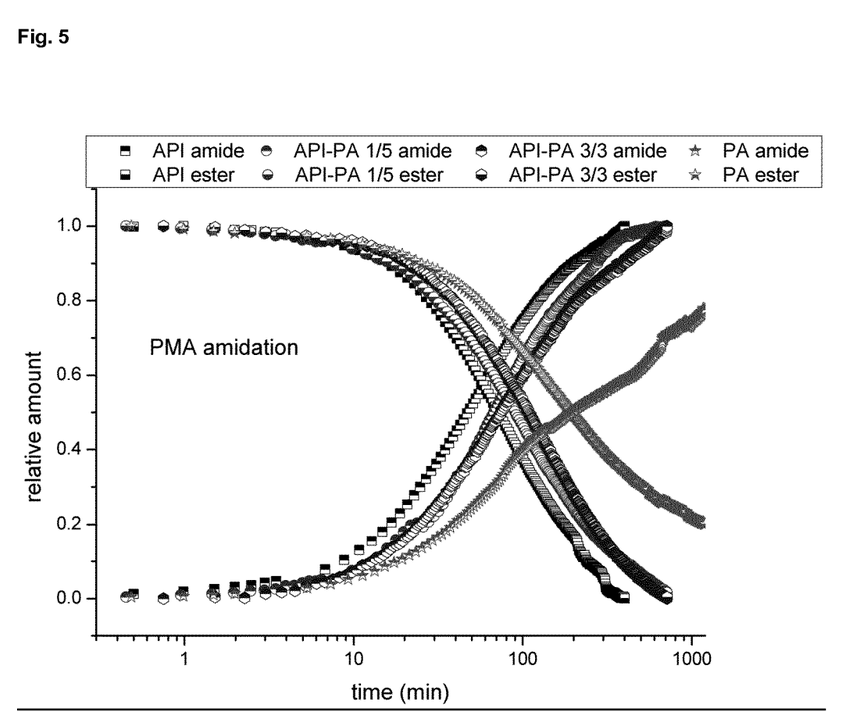
FIG. 5: Accelerated coamidation on PMA, combining the functional amine API with the non-functional PA.

In this example, we examined the accelerated co-amidation of reactants containing non-functionalized amines (Y) in the presence of at least one reactant containing a functionalized amine (X). The results of this experiment can be found in FIG. 5, and confirm the accelerated co-amidation on PMA, combining the functional amine API with the non-functional PA.

Example 3: Mechanism

In this example, the mechanism of the accelerated amidation was investigated by comparing the reaction kinetics of P(C2MestOx) and PMA, i.e. polymers with ester groups in the side-chain or pendant ester groups, with poly(caprolactone), i.e. a polymer with ester groups in the polymer backbone or in-chain esters. In short, a solution of polymer (2.5 mmol of ester groups, 1 eq) in 2 mL DMSO was prepared. Next a solution of TBD (1.25 mmol, 0.5 eq) and ethanolamine (15 mmol, 6 eq) and the appropriate volume of DMSO (to obtain a 3 mL solution) was prepared. Next, the solution containing the catalyst and ethanolamine was added to the ReactIR vial and the solution was heated in an oil bath at 70° C. After an equilibration time of 5 min, the measurements were paused, and the solution of polymer was added. Immediately after, the measurements were resumed and the reaction was followed in time. After the measurements, the polymers were isolated by precipitation of the polymer solution in THF. The polymer was isolated by centrifugation of the dispersion, removal of supernatant and subsequent dissolution in water. Finally, the polymer was purified by preparative SEC, and the obtained fractions were freeze-dried.

Example 4: Polymethyl Methacrylate

In this example, we examined the accelerated amidation with ethanolamine on Polymethyl methacrylate (PMMA). In short, 0.5 gram of PMMA (1 equivalent of ester groups) was mixed with 0.35 gram of TBD (0.5 equivalents) and 2.1 ml of ethanolamine (7 equivalents). The suspension was subsequently heated to 160° C. for 3 hours, after which a colorless viscous solution was obtained. The polymer was subsequently isolated by precipitation in alcohol, obtaining a white powder. The obtained degree of modification was determined by $^1$H NMR spectroscopy and was found to be 56%.

Example 5: Reactive Extrusion

In this example, we examined the accelerated amidation with ethanolamine on PMA through a continuous feed process, i.e. extrusion. In short, 7 gram of PMA (1 equivalent of ester groups), 14.6 ml of ethanolamine (3 equivalents) and 2.8 gram of TBD (0.25 equivalents) measured prior to the reaction. The reagents were subsequently combined in a preheated extruder set at 130° C., after which the desired end product was collected after 8 minutes of residence time in the extruder. The product was purified though dialysis in water.

REFERENCES

Bouten et al., 2015—Synthesis of poly(2-oxazoline)s with side chain methyl ester functionalities: detailed understanding of living copolymerization behaviour of methyl ester containing monomers with 2-alkyl-2-oxazolines—Polym Chem 6, p. 514-518

Das et al., 2016—Activated Ester Containing Polymers: Opportunities and Challenges for the Design of Functional Macromolecules—Chem Rev 116 (3), p 1434-1495

Dehghani et al., 2016—Crosslinking Polymer Brushes with Ethylene Glycol-Containing Segments: Influence on Pysicochemical and Antifouling Properties—Langmuir 32(40) p 10317-10327

Easterling et al., 2017—Synthetic upcycling of polyacrylates through organocatalyzed post-polymerization modification—Chem. Sci. 8, p 7705-7709

Eberhardt et al., 2005—Synthesis of pentafluorophenyl (metha)acrylate polymers: New precursor polymers for the synthesis of multifunction materials—Eur. Polym. J 41, 1569-1575

Ferguson, C. J. et al., 2005—Ab Initio Emulsion Polymerization by RAFT-Controlled Self-Assembly.—Macromolecules 2005, 38 (6), 2191-2204

Fleischmann et al., 2017—Direct access to functional meth (acrylate) copolymers through transesterification with lithium alkoxides—Polymer Chemistry 55 (9): p 1566-1574

Henry et al., 2010—Surface modification of Poly(methyl methacrylate) used in the fabrication of microanalytical devices—Anal. Chem. 2000, 72, p 5331-5337

Horn et al., 2012—Mechanisms of Organocatalytic Amidation and Trans-Esterification of Aromatic Esters As a Model for the Depolymerization of Poly(ethylene) Terephthalate—J. Phys. Chem A, 116, p 12389-12398

Kakuchi et al., 2014—Activation of Stable Polymeric Esters by Using Organo-Activated Acyl Transfer Reactions—J. Pol. Sci. 52, p 1353-1358

Kiesewetter et al., 2009—Cyclic Guanidine Organic Catalysts: What is Magic About Triazabicyclodecene?—J. Org. Chem. 74, p. 9490-9496

Mees & Hoogenboom, 2015—Functional poly(2-oxazoline)s by direct amidation of methyl ester side chains—Macromolecules 48 (11), p 3531-3538

Sabot et al., 2007—A convenient aminolysis of esters catalysed by 1,5,7-triazabicyclo[4.4.0]dec-5-ene (TBD under solvent-free conditions—Tetrahedron letters 48: p 3863-3866

The invention claimed is:

1. A method for the preparation of an amidated polymer, the method comprising:
    reacting a homopolymer or copolymer with a guanidine-based catalyst and a reactant (X) to obtain the amidated polymer,
    wherein:
    the homopolymer or copolymer comprises monomeric units;
    the monomeric units comprise at least two adjacent monomeric units each having an ester-containing side chain; and
    the reactant (X) has at least one amine moiety and a hydroxy moiety.

2. The method of claim 1, wherein reacting the homopolymer or copolymer is performed in the presence of at least one further reactant (Y) having at least one amine moiety and lacking a hydrogen-bond donating or accepting moiety.

3. The method of claim 1, wherein the reactant (X) has at least one amine moiety and one or more functional groups selected from alcohols, carboxylic acids, and esters.

4. The method of claim 1, wherein the guanidine-based catalyst is selected from the group consisting of triazabicyclo-decene, guanidine, methyl-triazabicyclo-decene, and triazabicyclo-octene.

5. The method of claim 4, wherein the guanidine-based catalyst is triazabicyclo-decene.

6. The method of claim 4, wherein the reactant (X) is an aminoalcohol.

7. The method of claim 6, wherein the aminoalcohol is selected from the group consisting of ethanolamine, propanolamine, butanolamine, pentanolamine, 1-amino-2-propanol, and aminoglycerol.

8. The method of claim 4, wherein the reactant (X) is an amino thiol.

9. The method of claim 8, wherein the amino thiol is selected from the group consisting of cysteine and methionine.

10. The method of claim 1, wherein the reactant (X) is an aminoalcohol.

11. The method of claim 10, wherein the aminoalcohol is selected from the group consisting of ethanolamine, propanolamine, butanolamine, pentanolamine, 1-amino-2-propanol, and aminoglycerol.

12. The method of claim 1, wherein the reactant (X) is an amino thiol.

13. The method of claim 12, wherein the amino thiol is selected from the group consisting of cysteine and methionine.

14. The method of claim 1, wherein the homopolymer or copolymer is selected from the group consisting of acrylic ester polymers, poly(2-oxazolines), poly(methylacrylate), poly(methyl methacrylate), and poly(methyl 4-vinylbenzoate).

15. The method of claim 1, wherein reacting the homopolymer or copolymer is performed in a solvent selected from the group consisting of dimethylsulfoxide, acetonitrile, dimethylformamide, and dimethylacetamide.

16. The method of claim 1, wherein:
the homopolymer or copolymer is selected from the group consisting of acrylic ester polymers, poly(2-oxazolines), poly(methylacrylate), poly(methyl methacrylate), and poly(methyl 4-vinylbenzoate);
the guanidine-based catalyst is selected from the group consisting of triazabicyclo-decene, guanidine, methyl-triazabicyclo-decene, and triazabicyclo-octene; and
the reactant (X) is an aminoalcohol or an amino thiol.

17. The method of claim 16, wherein the reactant (X) is an aminoalcohol selected from the group consisting of ethanolamine, propanolamine, butanolamine, pentanolamine, 1-amino-2-propanol, and aminoglycerol.

18. The method of claim 17, wherein the guanidine-based catalyst is triazabicyclo-decene.

19. The method of claim 16, wherein the reactant (X) is an amino thiol selected from the group consisting of cysteine and methionine.

20. The method of claim 17, wherein the guanidine-based catalyst is triazabicyclo-decene.

* * * * *

UNITED STATES PATENT AND TRADEMARK OFFICE
CERTIFICATE OF CORRECTION

PATENT NO. : 11,332,554 B2
APPLICATION NO. : 17/057904
DATED : May 17, 2022
INVENTOR(S) : Richard Hoogenboom and Joachim Van Guyse It is certified that error appears in the above-identified patent and that said Letters Patent is hereby corrected as shown below:

On the Title Page

In page 2, Column 2, Item (56), other publications, cite no. 4, delete "RAF1" and insert --RAFT--, therefor.

In the Specification

In Column 10, Line(s) 8, before "-position", delete "R" and insert --$\beta$--, therefor.

In Column 12, Line(s) 40, before "-position", delete "R" and insert --$\beta$--, therefor.

In Column 13, Line(s) 9, before "-position", delete "R" and insert --$\beta$--, therefor.

Signed and Sealed this
Twenty-seventh Day of September, 2022

Katherine Kelly Vidal
*Director of the United States Patent and Trademark Office*